UNITED STATES PATENT OFFICE.

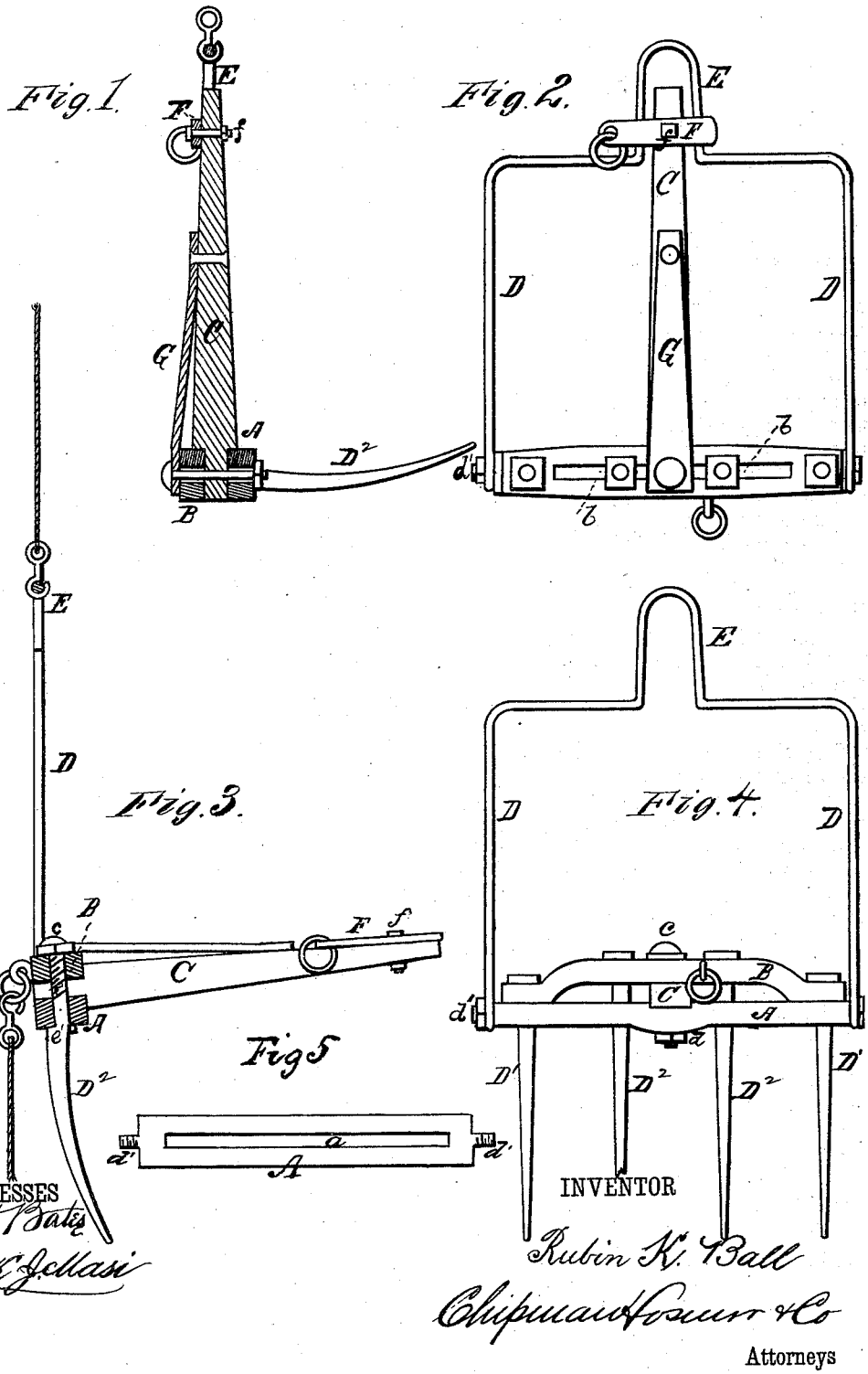

RUBIN K. BALL, OF MOUNT VERNON, OHIO.

IMPROVEMENT IN HORSE HAY-FORKS.

Specification forming part of Letters Patent No. 156,118, dated October 20, 1874; application filed August 29, 1874.

*To all whom it may concern:*

Be it known that I, RUBIN K. BALL, of Mount Vernon, in the county of Knox and State of Ohio, have invented a new and valuable Improvement in Hay-Forks; and I do hereby declare that the following is a full, clear, and exact description of the construction and operation of the same, reference being had to the annexed drawings making a part of this specification, and to the letters and figures of reference marked thereon.

Figure 1 of the drawing is a representation of a sectional view of my hay-fork. Fig. 2 is a plan view. Fig. 3 is a sectional view. Fig. 4 is a rear view, and Fig. 5 is a detail view, of the same.

This invention has relation to hay-forks used in raising hay into barns, wherein a tripping-catch is used for the purpose of allowing the load to be discharged from the tines thereof; and the novelty consists in a double-slotted head for the teeth of said forks, wherein the teeth are adjustably secured, for the purpose of allowing the said teeth to be set at a greater or less distance apart, according to the length of the blades of hay, or of inserting an additional number when necessary.

In the annexed drawings, A designates the front, and B the rear head, of my improved hay-fork, through which rectangular registering-slots $a\ b$ are cut in any suitable manner, both being preferably made of iron. The head B is slightly arched from its ends toward the center, thus providing a space into which a, preferably, wooden handle, C, is rigidly secured by means of a bolt, $c$, and a nut, $d$, the former being inserted into registering-holes through both heads, thereby also securing a center fastening for the said parts, the extremities of which are in like manner bolted together, in a manner to be yet explained. D represents a metallic bail, which is looped at both of its free ends for the purpose of allowing its convenient attachment to head A of the rake, the ends of which are provided for this purpose with trunnions having screw-threaded ends over which the said loops are passed and secured by a suitable nut, $d'$. This construction will allow the two heads to rotate in the loops of the bail D, of which the upper end is provided with a bridge or open loop, E, preferably of but little greater width than the handle C, through which the said handle will freely pass. $D^1$ indicates the end, and $D^2$ the intermediate, teeth of my improved fork, the former of which are inserted into registering perforations in the ends of the heads and are there held by a suitable nut, and the latter into the slots $a\ b$ of the said heads, where they are similarly secured. These teeth may be of any desired curvature, and are each provided with a reduced shank, $e$, thus affording a shoulder, $e'$, for the purpose of preventing them from being pushed through the said slots and perforations, and a head by means of which the shanks $e$ may perform a clamping function for the heads.

An examination of the drawings will disclose the fact that, owing to the slots $a\ b$ and the shanks $e$ of the teeth $D^2$, the said teeth may be spaced at any desired distance apart; hence, when an unusually short-speared lot of hay is to be stored in a barn, additional teeth may be added for the purpose of preventing the escape of the hay through the spaces between the teeth, constituting an economy of both time and labor.

F designates a tripping catch or lever, of sufficient length to span the horizontal distance between the vertical sides of the bridge E, and which is pivoted at $f$ to the wooden handle C of the fork. When a charge has been gathered upon the teeth $D^1\ D^2$ of the fork, the bail D will be caused to vibrate upward upon its trunnions into a vertical position and the pivoted tripping-lever placed in a horizontal position across the bridge E, as indicated in Fig. 2. The fork may now be raised to any desired height, the weight of the hay upon the teeth of the fork holding the said tripping-lever from slipping or displacement, thereby preventing the handle C from being carried through the bridge E. If, when the hay has reached the desired position, the long end of the tripping-lever F be drawn down into a position in line with the vertical handle C, the latter will pass through the bridge, owing to its release from the constraint of the tripping-lever, and the teeth will be forced into the position shown in Fig. 3, allowing the hay to fall from the teeth into the mow. The hoisting-tackle for elevating the loaded fork will be secured in any suitable manner to the bridge E of the bail D.

It will be seen from the above description that by means of the slots $a$ $b$, and the shanks of the teeth having each a shoulder, the teeth are not only adjustable to or from the center, but that by this peculiar construction they render the use of bolts unnecessary. It will also be seen that the tripping-lever, while of simple construction and application, most effectually serves its purpose—that of preventing the prongs of the fork from discharging their load prematurely.

What I claim as new, and desire to secure by Letters Patent, is—

1. In an elevating hay-fork, the combination, with the heads A B, having slots $a$ $b$, of the teeth $D^1 D^2$, having a shoulder, $e'$, and a screw-threaded end, substantially as specified.

2. The arched head B, having slot $b$, and the head A, having slot $a$, combined and arranged substantially as specified.

In testimony that I claim the above I have hereunto subscribed my name in the presence of two witnesses.

RUBIN K. BALL.

Witnesses:
  JOHN S. BRADDOCK,
  H. H. GREER.